United States Patent
Klopfer

[15] 3,678,113
[45] July 18, 1972

[54] NUCLEARLY ALKYLATED ANILINE RECOVERY PROCESS

[72] Inventor: Oskar E. H. Klopfer, Baton Rouge, La.
[73] Assignee: Ethyl Corporation, New York, N.Y.
[22] Filed: Feb. 4, 1970
[21] Appl. No.: 8,734

Related U.S. Application Data

[63] Continuation-in-part of Ser. No. 782,706, Dec. 10, 1968.

[52] U.S. Cl..................260/578, 260/570 R, 260/570 D, 260/571, 260/575, 260/576, 260/577
[51] Int. Cl..................................................C07c 87/00
[58] Field of Search............260/578, 582, 571, 575, 570 R, 260/570 D

[56] References Cited

UNITED STATES PATENTS 3,275,690   9/1966   Stroh et al. .........................260/578

Primary Examiner—Robert V. Hines
Attorney—Donald L. Johnson

[57] ABSTRACT

An improvement in the nuclear orthoalkylation of aromatic amines by reaction of an aromatic amine having a hydrogen atom or a nuclear carbon atom ortho to an amino group (e.g., aniline) with an olefin and a catalytic amount of an alkyl aluminum halide whereby the catalyst is removed from the reaction mixture after completion of the alkylation by washing the reaction mixture with water. The water wash phase separates readily without the necessity of adding caustic.

11 Claims, No Drawings

NUCLEARLY ALKYLATED ANILINE RECOVERY PROCESS

This application is a Continuation-in-Part of application, Ser. No. 782,706, filed Dec. 10, 1968.

BACKGROUND

Aromatic amines are useful in a broad range of applications. For example, they are antiknock agents in gasoline used in spark ignited internal combustion engines. They are also valuable intermediates in the dye industry. They are beneficial when added to rubber wherein they prevent degradation caused by oxygen and/or ozone. Another use in particular for anilines substituted in the ortho position with an ethyl radical is in the preparation of indole and indole derivatives. For example, orthoethyl aniline is converted to indole by contact with a titanium dioxide catalyst at a temperature of around 600° C. (U.S. Pat. No. 2,886,573).

Prior to the work of Kolka et al. (U.S. Pat. No. 2,814,646) no commercially practical method was known for the orthoalkylation of aromatic amines. Kolka et al. found that they could obtain good yields of orthoalkylated aromatic by reacting an olefin with an aromatic amine in the presence of an aluminum anilide. Another process employing an aluminum catalyst or a compound which will decompose to form metallic aluminum is described by Stroh et al. in U.S. Pat. No. 2,762,845. In my prior application, Ser. No. 782,706, I described a method of alkylating aromatic amines at a higher rate and using less catalyst through the use of an alkyl aluminum halide.

SUMMARY

The present invention relates to an improvement in the alkyl aluminum halide process of orthoalkylating an aromatic amine. The improvement comprises the use of a neutral water wash to remove the catalyst after the completion of an alkylation reaction carried out by addition of an alkyl aluminum halide to an aromatic amine and reacting the mixture with an olefin. In previous methods of removing aluminum-containing catalysts from similar alkylation mixtures it has been found necessary to employ a caustic wash to remove the catalyst in order to avoid the formation of aluminum gels. In the present improved process it is not necessary to employ a caustic wash, which results in a significant savings.

DESCRIPTION OF THE PREFERRED EMBODIMENTS

A preferred embodiment of this invention is an improvement in a process for the selective nuclear alkylation of an aromatic amine having at least one hydrogen atom bonded to a nuclear carbon atom ortho to an amino group and having at least one hydrogen atom bonded to the nitrogen atom of said amino group, said process comprising adding a catalytic amount of an alkyl aluminum halide to said aromatic amine and heating the mixture with an olefin to a temperature of from about 100°–500° C. In the improvement the catalyst is removed in a clear aqueous phase from the reaction mixture by mixing water with the reaction mixture after completion of the alkylation reaction and separating the water phase. The catalyst is extracted into the water phase forming a substantially clear solution and can readily be removed from the reaction mixture.

The aromatic amines that can be used in the alkylation process can be mono- or poly- nuclear and also mono- or polyamino as, for example, amino benzenes, amino naphthalenes, amino anthracenes, amino phenanthrenes, amino chrysenes, amino pyrenes, and the like. The aromatic amines can also have other nuclear substituents such as alkyl, aryl, alkaryl, aralkyl, cycloalkyl, substituted-cycloalkyl, halogen, alkoxy, aryloxy, and the like. Likewise, the nuclear substituents may form a closed ring such as in the case of indene. All that is required is that at least one position ortho to the amine radical is unsubstituted except for hydrogen, and that the amine nitrogen atom have at least one hydrogen atom bonded thereto. Of the various aromatic amines, the preferred are the mono-, di- or tri- nuclear amines. In particular, the amino benzenes are most useful.

Examples of suitable amines include:
m-toluidine
o-toluidine
4-isobutylaniline
4-sec-eicosylaniline
N-methylaniline
2-tert-butylaniline
4-phenylaniline
4-α-methylbenzylaniline
4,4'-methylenebisaniline
4,4'-isopropylidenebisaniline
p-phenylenediamine
N,N'-dimethyl-p-phenylenediamine
6-sec-eicosyl-α-naphthylamine
α-naphthylamine
β-naphthylamine
N-methyl-α-naphthylamine
α-aminoanthracene
3-aminophenanthrene
7-aminoindene
1-aminochrysene
2-aminopyrene
4-cyclohexylaniline
4-phenylaniline The most preferred amines are the primary and secondary amino benzenes, referred to collectively as anilines. Examples of these are:
aniline
N-methylaniline
N-ethylaniline
p-sec-docosylaniline
p-methoxyaniline
p-bromoaniline
N-butyl-m-bromoaniline Of these, the most preferred aromatic amine is aniline itself.

The alkyl aluminum halides added to the aromatic amines prior to reaction with olefins include any aluminum compound containing both an alkyl radical in which a carbon atom of the alkyl is bonded directly to an aluminum atom and also containing a halogen atom bonded directly to the aluminum atom. These include the dialkyl aluminum halides, the alkyl aluminum di-halides, and the alkyl aluminum sesquihalides. Some examples of suitable dialkyl aluminum halides are:
dimethyl aluminum bromide
diethyl aluminum bromide
diethyl aluminum chloride
di-n-propyl aluminum chloride
diisobutyl aluminum iodide
diisoamyl aluminum chloride
di-n-dodecyl aluminum chloride
dieicosyl aluminum bromide Examples of useful alkyl aluminum dihalides include:
methyl aluminum dichloride
ethyl aluminum dichloride
ethyl aluminum dibromide
n-propyl aluminum dichloride
isobutyl aluminum dibromide
n-hexyl aluminum dibromide
sec-decyl aluminum di-iodide
n-dodecyl aluminum dichloride
n-eicosyl aluminum dibromide Both the above dialkyl aluminum halides and the alkyl aluminum dihalides are believed to exist in the form of dimers and these, of course, are included within the invention.

Alkyl aluminum sesquihalides have the empirical formula:

$$R_3 Al_2 X_3$$

in which R represents an alkyl group and X a halogen atom.
Examples of useful alkyl aluminum sesquihalides include:
methyl aluminum sesquichloride
methyl aluminum sesquibromide
ethyl aluminum sesquichloride
ethyl aluminum sesquibromide
ethyl aluminum sesquiiodide
n-propyl aluminum sesquichloride
n-propyl aluminum sesquibromide isobutyl aluminum sesquichloride
isobutyl aluminum sesqui-iodide
n-hexyl aluminum sesqui-iodide
n-decyl aluminum sesquichloride
n-dodecyl aluminum sesquibromide
sec-eicosyl aluminum sesquichloride The above alkyl aluminum halides can be used individually or can be added to the aromatic amine as mixtures with good results. Frequently, due to their tendency to ignite on exposure to air, they are used in the form of solutions in inert solvents such as hydrocarbons or ethers. Particularly useful solvents are the hydrocarbons such as hexane, heptane, isooctane, benzene, toluene, xylene, and the like.

Although the preferred catalysts are the alkyl aluminum halides, the process can also be carried out using aryl aluminum halides and, hence, these are considered equivalents. The alkyl aluminum halides are more readily available and are, accordingly, preferred.

The amount of alkyl aluminum halide added should be a catalytic amount. This means it should be sufficient to cause the olefin to alkylate the aromatic amine at a satisfactory rate under the reaction conditions employed. At higher temperatures and/or higher olefin concentrations, less catalyst is required. In general, good results are obtained if sufficient alkyl aluminum halide is added to the aromatic amine to provide one gram atom of aluminum for each 5–40 gram moles of aromatic amine, although more or less can be used. A most preferred operating range is the amount sufficient to provide 1 gram atom of aluminum for each 7–25 gram moles of aromatic amine.

The olefins useful in the process include olefins which are both mono- or poly-unsaturated, cyclic or acyclic, substituted or unsubstituted, and both terminal and internal olefins. Examples of acyclic monoolefins are ethylene, propylene, butene-1, butene-2, isobutene, pentene-1, isopentene, pentene-2, hexene-1, hexene-2, 2-methyl pentene-1, 2-methyl pentene-2, n-decene-1, 2-ethyl octene-1, 2-ethyl octene-2, n-decene-2, dodecene-1, 2-ethyl decene-1, 2-ethyl decene-2, dodecene-2, octadecene-1, octadecene-2, 2-methyl heptadecene-1, diisobutylene, eicosene-1, eicosene-2, 2-ethyl octadecene-1, docosene-1, docosene-2, triacontene-1, 2-ethyl octacosene-1, tetracontene-2, pentacontene-1, and the like.

Examples of cyclic monoolefins are cyclopentene, cyclohexene, cyclooctene, 1-methylcyclohexene, 1-butylcyclohexene, 1-methylcyclooctene, and the like.

Useful acyclic polyenes include 1,3-butadiene, 2-methyl-1,3-butadiene, 2,3-dimethyl-1,3-butadiene, 1,4-pentadiene, and the like. Some useful cyclic polyenes are cyclopentadiene, dicyclopentadiene, 1,3-cyclooctadiene, 1,3-cyclopentadiene, 1,4-octadiene, 1,3,5-cyclooctatriene, and the like.

The substituted olefins can have any substituents that do not interfere with the reaction. Examples of such substituents are halogens, alkoxy groups, aryloxy groups, aryl radicals, and the like. Illustrative examples of such olefins are 2-chloro-1,3-butadiene, vinyl chloride, allyl chloride, vinyl bromide, ethyl vinyl ether, phenyl vinyl ether, butyl vinyl ether, lauryl acrylate, methyl acrylate, indene, α-methyl styrene, 4-dodecyl styrene, 4-sec-octyl-α-methyl styrene, and the like.

In general, the most preferred olefin reactants are the acyclic monoolefins containing from two to 50 carbon atoms, cyclic olefins containing from five to 10 carbon atoms, and aryl-substituted monoolefins containing from eight to 20 carbon atoms.

The amount of olefin added to the aromatic amine will vary depending upon whether mono- or di-alkylation is desired. The precise amount is not a critical feature of the process. In general, from about 0.5 mole equivalent to 8 mole equivalents of olefin are added for each mole of aromatic amine. A most useful range is from about one mole equivalent to 3 mole equivalents of olefin for each mole equivalent of aromatic amine.

The process proceeds best at elevated temperatures. A useful range is from about 100°–500° C. A preferred temperature range is from about 200°–400° C., and best results are usually obtained at about 300°–350° C.

The pressure under which the reaction is conducted is not an independent variable, and varies with the temperature and vapor pressure of the reactants. With the more volatile lower olefins such as ethylene, the reaction pressure will be quite high, while with the higher olefins only moderate pressures will be observed. Depending upon the reactants and the temperature, the pressure will range from about atmospheric to 2,500 psig.

The process should be conducted under a substantially inert atmosphere. Excessive amounts of oxygen or moisture will stop the alkylation. This is not to say that the reactants need be absolutely anhydrous, but only that they should be substantially anhydrous. Also, the amount of oxygen in the reaction vessel should be minimized, generally by flushing the reaction vessel with an inert gas such as nitrogen, methane, ethane or propane, prior to conducting the reaction.

The reaction can be conducted in the presence of an inert solvent. Suitable solvents include aromatic and aliphatic hydrocarbons. Examples of useful aromatic hydrocarbons are toluene, xylene, mesitylene, and the like. Examples of useful aliphatic hydrocarbons are hexane, n-octane, isooctane, decane, and the like.

It is generally preferred to first add the alkyl aluminum halide to the aromatic amine, heat the mixture, and then add the olefin over a period of time as the reaction proceeds. Variations of this sequence are possible which will accomplish similar results. For example, the olefin can be added to the aromatic amine followed by the addition of the alkyl aluminum halide. Likewise, the alkyl aluminum halide can be dissolved in the olefin and this solution added to the aromatic amine. These variations are all considered equivalents of the preferred method.

The reaction time will vary to some extent with the reactants used. A greater influence is exerted by the reaction temperature and the amount of alkyl aluminum halide added. The process should be conducted until the desired degree of orthoalkylation is attained. The progress of the reaction is readily monitored by periodically withdrawing samples and analyzing them by vapor phase chromatograph.

After completion of the alkylation the reaction mixture contains the catalyst. It is generally desirable to remove the aluminum-containing catalyst prior to using the alkylated aromatic amine. The alkylated amine can sometimes be distilled or steam distilled directly from the catalyst containing reaction mixture, but this is generally undesirable because some dealkylation is generally encountered and the resulting catalyst residue results in a difficult clean-up problem and can result in column plugging in commercial distillation columns. In the past, aluminum-containing catalysts have been removed from similar reaction mixtures by adding a small amount of water and filtering off the precipitated aluminum hydroxide. Aqueous aluminum hydroxide is notorious for its poor filtration properties. The catalyst has also been removed by employing an aqueous caustic wash. This requires a large excess of caustic and adds substantially to the production cost. In the present improved process water is merely added to the reaction mixture after completion of the alkylation. This mixture is stirred and then the clear water phase separated. The present process is unique in this respect because attempts to remove catalysts from a similar process employing, for example, an aluminum anilide catalyst, will result in the precipitation of aluminum hydroxide, which makes separation difficult.

The amount of water should be sufficient to extract the aluminum content and provide aqueous phase. There is no critical upper limit, but practicalities dictate against use of excessive amounts. In general, good results are obtained by using about 5–100 parts of water for each 100 parts of reaction mixture. A preferred amount is from about 10–60 parts of water for each 100 parts of reaction mixture.

Initially, upon addition of water the reaction mixture turns clouded. Aging the mixture causes the cloudiness to disappear, resulting in two clear phases. This aging is preferably carried out while the mixture is maintained at elevated temperatures. A preferred aging temperature is from about 50°–175° C., and a most preferred range is from about 90°–100° C. When temperatures over atmospheric boiling point are used the aging must be carried out in a sealed pressure vessel because of the vapor pressure of the water above its normal boiling point.

The aging should be carried out long enough to form two clear phases. Too long an aging period results in gel formation which makes separation impractical. Also, the period of aging depends upon the aging temperature. In general, an aging period of from 15 minutes to 3 hours at a temperature of from about 50°–175° C. gives good results. A preferred aging treatment is at a temperature of about 75°–100° C. for from about 15 minutes to 3 hours. At lower temperatures longer aging periods will be more beneficial. The correct aging time is readily determined by merely observing the mixture. The time should be sufficient to cause the formation of two clear phases, but not so long as to result in gel formation.

After the mixture forms two clear phases the aqueous phase is removed by such means as settling or by centrifugation and the organic phase either used as is or purified by distillation.

The following examples serve to illustrate the method of carrying out the invention. All parts are by weight unless otherwise specified.

EXAMPLE 1

Alkylation of Aniline

Into a pressure vessel was placed 24,510 parts of aniline, following which the vessel was purged with nitrogen and sealed. While stirring, the aniline was heated to 128° C. and then 1,586 parts of diethyl aluminum chloride were added over a 25-minute period at 125°–146° C. The vessel was then pressurized with ethylene to 300 psig and heated to about 312° C. Ethylene feed was commenced, and 16,140 parts of ethylene were fed to the reaction at a temperature range of about 320°–340° C. Gas chromatographic analysis of the reaction mixture showed it to contain 91.1 per cent 2,6-diethyl aniline.

CATALYST REMOVAL

The reaction mixture was cooled and 5,190 parts of water added. The vessel was again sealed and, while stirring, heated to 170° C. It was stirred at 172°–178° C. for 100 minutes and then cooled. The vessel was discharged and the reaction mixture separated into two clear layers which did not contain any solids. The aqueous layer was removed and substantially pure 2,6-diethyl aniline recovered from the organic phase by distillation.

EXAMPLE 2

The alkylation procedure of Example 1 was repeated. Following the alkylation, 8,450 parts of water were added to the reaction mixture and the pressure vessel sealed. The mixture was stirred and heated to 100° C. and maintained at this temperature for 15 minutes. Following this, the mixture was cooled and the aqueous phase allowed to separate. The aqueous phase was drained off and 2,6-diethyl aniline recovered from the organic phase by distillation.

EXAMPLE 3

This example illustrates the formation of a gelatinous phase when the hydrolytic aging is conducted for too long a period. An alkylation was conducted in the same manner as in Example 1. Following this, 8,450 parts of water were added to the reaction mixture and the pressure vessel sealed. The mixture was stirred and heated to a temperature of 100°–105° C. for 240 minutes. A gelatinous phase separated, making separation impractical.

When the above experiment was repeated and the hydrolytic aging limited to 180 minutes a gelatinous phase was not encountered.

EXAMPLE 4

An alkylation was conducted in the same manner as in Example 1. Following this, 8,450 parts of water were added to the reaction mixture and the mixture stirred and heated to 100° C. It was stirred at this temperature for an extended period, during which time the stirrer was periodically turned off and the nature of the aqueous phase observed. After 15 minutes of stirring, the aqueous phase was slightly cloudy but fluid. No gel was present. After 30 minutes of stirring the aqueous phase was practically clear and no gel was present. After 1 hour of stirring the aqueous phase was clear and fluid with no evidence of gel. After 2-½ hours of stirring the aqueous phase was still clear and fluid with no evidence of gel. After 3 hours of stirring the aqueous phase was still fluid, but was just starting to become gelatinous. The above demonstrates the effect of the hydrolytic aging period on the nature of the aqueous extract. It is apparent from the above the manner in which the preferred period of hydrolytic aging can be determined for any alkylation procedure of the present invention.

EXAMPLE 5

An alkylation is carried out in a manner similar to that in Example 1 except that methyl aluminum sesquichloride is employed instead of diethyl aluminum chloride. Following the alkylation, 10,000 parts of water are added to the reaction mixture, which is stirred and heated to 90° C. and stirred at this temperature for 2-½ hours. Following this, the aqueous phase is allowed to separate and is removed from the organic phase. Both o-ethyl aniline and 2,6-diethyl aniline are recovered from the organic phase by distillation.

Good results can be obtained following the above procedure using other alkyl aluminum halides such as ethyl aluminum sesquichloride, diethyl aluminum bromide, ethyl aluminum sesquibromide, and the like. Likewise, the process can be carried out on a variety of aromatic amines meeting the requirements that have been previously described. For example, the process can be carried out using m-toluidine, o-toluidine, β-naphthyl amine, α-naphthyl amine, p-phenylenediamine, n-methyl aniline, 7-aminoindene, 2-amino pyrene, and the like.

EXAMPLE 6

In a pressure reaction vessel is placed 930 parts of aniline and 120 parts of di-n-propyl aluminum chloride. The reaction vessel is flushed with propylene and then sealed and pressurized to 100 psig with propylene. While stirring, it is heated to 300° C. and then additional propylene pumped in until the pressure is 650 psig. Alkylation is continued for 4 hours, following which the reaction mixture is cooled to 90° C. Residual pressure is vented and 400 parts of water added. The mixture is stirred at 95°–100° C. for 2 hours and then the phases are allowed to separate. The lower aqueous phase is drained off and the organic phase distilled to recover o-isopropyl aniline and 2,6-diisopropyl aniline in high yield.

Other olefins can be used in the above procedure with good results. For example, butene-1 yields principally o-sec-butyl aniline. Likewise, dodecene-1 gives a good yield of o-sec-dodecyl aniline. Use of cyclohexene yields a mixture of o-cyclo-hexyl aniline and 2,6-dicyclohexyl aniline.

As stated previously, the orthoalkylated aromatic amines produced by this process are useful for many purposes such as antioxidants, antiozonants, antiknock agents for gasoline, and the like. When used as antioxidants or antiozonants, mainly in rubber, they are merely added to the substrate to be protected at concentrations of from about 0.1 to 3 weight per cent. A principal use for the aromatic amines is as chemical intermediates. For example o-ethyl aniline is readily converted to indole, a valuable chemical compound, following the process of U.S. Pat. No. 2,886,573. The alkylated amines are also useful as intermediates for herbicides. For example, 2,6-dialkyl anilines such as 2,6-diethyl anilines may be used to prepare the plant growth regulators described in U.S. Pat. No. 3,403,994.

I claim:

1. In a process for the selective nuclear alkylation of an aromatic amine having at least one hydrogen atom bonded to a nuclear carbon atom ortho to an amino group and having at least one hydrogen atom bonded to the amino nitrogen atom of said amino group, said process comprising adding a catalytic amount of an alkyl aluminum halide to said aromatic amine and heating the mixture with an olefin to a temperature of from about 100°–500° C., the improvement whereby the catalyst is removed from the reaction mixture consisting essentially of mixing water with said reaction mixture after completion of the alkylation reaction, allowing the water phase to separate and removing said water phase.

2. The process of claim 1 wherein said alkyl aluminum halide is diethyl aluminum chloride.

3. The process of claim 1 wherein said aromatic amine is aniline.

4. The process of claim 3 wherein said alkyl aluminum halide is diethyl aluminum chloride.

5. The process of claim 3 wherein said olefin is ethylene.

6. The process of claim 5 wherein said alkyl aluminum halide is diethyl aluminum chloride.

7. The process of claim 6 wherein after addition of water to said reaction mixture the resultant mixture is aged for a period of from 15 minutes to 3 hours at a temperature of from 75°–100° C. prior to removing said water phase.

8. The process of claim 5 wherein said alkyl aluminum halide is ethyl aluminum sesquichloride.

9. The process of claim 1 wherein said olefin is ethylene.

10. The process of claim 9 wherein said alkyl aluminum halide is diethyl aluminum chloride.

11. The process of claim 9 wherein said alkyl aluminum halide is ethyl aluminum sesquichloride.

* * * * *